United States Patent [19]
Itoh

[11] Patent Number: 5,999,831
[45] Date of Patent: Dec. 7, 1999

[54] PORTABLE RADIO

[75] Inventor: Ryoh Itoh, Tokyo, Japan

[73] Assignee: NEC Corporation, Tokyo, Japan

[21] Appl. No.: 08/827,192

[22] Filed: Mar. 27, 1997

[30] Foreign Application Priority Data

Apr. 1, 1996 [JP] Japan .................................. 8-078942

[51] Int. Cl.$^6$ .................................................. H04B 1/38
[52] U.S. Cl. ......................... 455/575; 455/90; 343/702
[58] Field of Search ............................ 455/575, 90, 550, 455/301, 302, 347, 351; 343/702, 841; 379/428, 430; 361/814, 816

[56] References Cited

U.S. PATENT DOCUMENTS

| | | |
|---|---|---|
| 5,170,173 | 12/1992 | Krenz et al. . |
| 5,493,702 | 2/1996 | Crowley et al. .......................... 455/575 |
| 5,517,676 | 5/1996 | Sekine et al. ............................ 455/575 |
| 5,706,332 | 1/1998 | Nagai ....................................... 455/575 |

FOREIGN PATENT DOCUMENTS

| | | |
|---|---|---|
| S47-021518 | 11/1972 | Japan . |
| H3-285425 | 12/1991 | Japan . |
| 4-127723 | 4/1992 | Japan . |
| H7-38461 | 2/1995 | Japan . |
| H07-203524 | 8/1995 | Japan . |
| H07-297751 | 11/1995 | Japan . |
| WO 94/25999 A1 | 11/1994 | WIPO . |

*Primary Examiner*—Nguyen Vo
*Assistant Examiner*—Duc Nguyen
*Attorney, Agent, or Firm*—Scully, Scott, Murphy & Presser

[57] ABSTRACT

In a portable radio of the present invention, in order to reduce an influence of a flexed unit near an antenna with a structure that the antenna is fitted to a flexion portion of the unit, a conduction portion of the unit is divided into upper and lower sections interposing an antenna fitting portion. An actual resistor is inserted into the middle of an connection line (cable) for electrically connecting the upper and lower sections, thereby cutting a high frequency current. Alternatively, an inductor is inserted into the middle of the connection line (cable), thereby cutting a conduction between the upper and lower sections in a high frequency manner. The unit of the portable unit may be a structure that it is divided into upper and lower unit sections and it is foldable.

10 Claims, 3 Drawing Sheets

PORTABLE RADIO

BACKGROUND OF THE INVENTION

1. Field of the Invention

The present invention relates to a portable radio, more particularly to a connection for connecting upper and lower unit sections of a flexed unit when an antenna is fitted to a flexion portion of the flexed unit.

2. Description of the Related Art

With regard to a portable radio used by being pressed against an ear of the human body like a portable telephone, a method to equip a flexion portion of the unit with an antenna has been proposed in order to improve an effect for preventing the human body from an electromagnetic wave by locating the antenna apart from the human being during conversation and in order to improve a radiation efficiency and radiation pattern of the antenna.

The portable telephone with the above described structure offers a problem that a metal portion over the antenna fitting portion causes a deterioration in the radiation efficiency of the antenna and produces phenomenon that a frequency bandwidth is narrowed during an operation of the antenna. To cope with this, in Japanese Patent Laid-Open No. Hei 4-127723, a portable radio has been proposed, which has a structure that the antenna is projected from the unit downward in order to reduce an effect of the head on the antenna. However, the portable radio still offers the concern that the radiation pattern will be affected since the body hides the antenna.

If no influence of the metal portion over the antenna exists in the portable radio used by pressing it against the ear of the human body like the portable telephone, the radiation efficiency of the antenna and the deterioration of the radiation pattern are improved and the phenomenon of narrowing the operation frequency bandwidth is relieved, whereby it will be possible to locate the antenna separating from the human body. Therefore, it is necessary to reduce the influence of the metal portion over the antenna on it.

SUMMARY OF THE INVENTION

The object of the present invention is to provide a portable radio which is capable of improving a protection of a human body from an electromagnetic wave, and a radiation efficiency and radiation pattern of an antenna, without adverse effect of a metal portion on the antenna.

In a portable radio which fits an antenna to a flexion portion of its unit, the improvement comprises upper and lower circuit portions arranged in each of upper and lower unit sections of the flexed unit, the upper and lower circuit portions being divided interposing a fitting portion of the antenna to the flexion portion; an external conduction body outside the unit; connection lines which connect the upper and lower circuit portions and the conduction body; and resistors, each being arranged in a middle of corresponding one of the connection lines, the resistors serving to cut a conduction of a high frequency current between the upper and lower circuit portions.

The resistors which cuts the conduction of the high frequency current between the upper and lower circuit portions may be an inductor.

Furthermore, some of the resistors which cut the conduction of the high frequency current between the upper and lower circuit portions may be inductors.

Still furthermore, the flexed unit may be a folding unit, and the antenna may be placed at a hinge portion of the folding unit.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENTS

A portable radio of the present invention includes a resistor and an inductor inserted into a connection line which connects upper and lower circuits disposed interposing a flexion portion of a unit.

Figure 1:
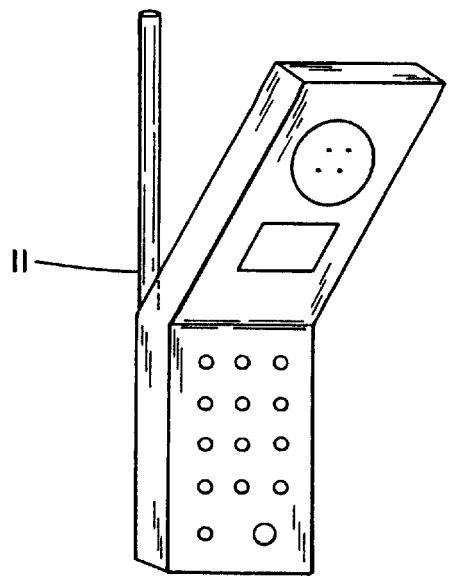
FIG. 1 is a perspective view of a portable radio.
Figure 2:
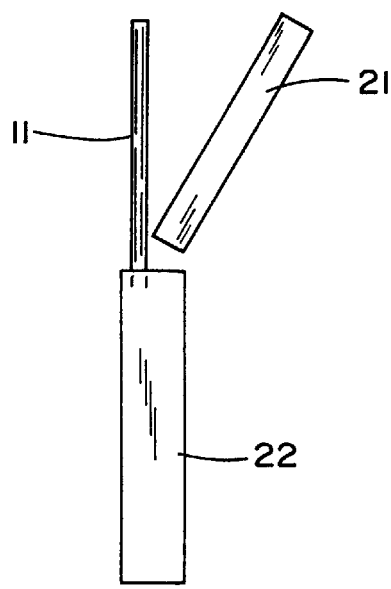
FIG. 2 is a conception arrangement drawing showing an antenna, an upper circuit, and a lower circuit of the portable radio.
Figure 3:
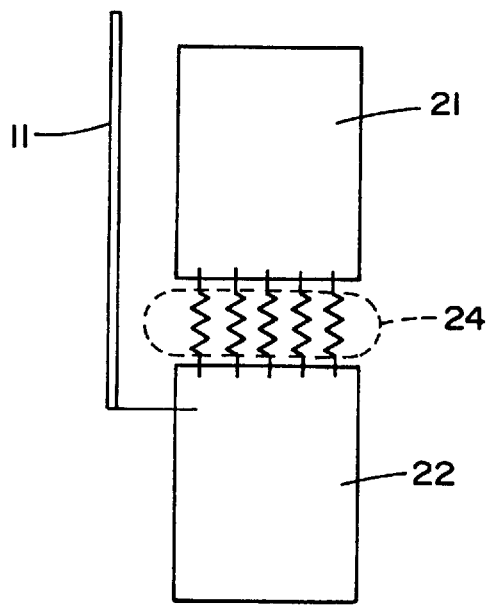
FIG. 3 is a conception drawing of a first embodiment of the present invention, wherein a resistor is connected to a connection line.

Specifically, an antenna 11 is arranged in the flexion portion (see FIG. 1), and a electric circuit is divided into upper and lower circuit portions 21 and 22 interposing a fitting portion of an antenna to a unit (see FIG. 2). A plurality of connection lines 24 (see FIG. 3) for connecting the upper and lower circuit portions 21 and 22 includes resistors (FIG. 3). The antenna is electrically connected to the lower circuit portion 22 (see FIG. 2).

Moreover, instead of the resistors 24 (see FIG. 3), an inductor may be used. Or, either the resistor or the inductor may be used every connection line for the convenience of the circuit. A series circuit composed of the resistor and the inductor may be arranged in each connection line.

The portable radio of the present invention, in a high frequency manner, cuts the upper and lower circuit portions 21 and 22 with resistors 24. For this reason, an influence of the upper circuit portion 21 on the antenna connected to the lower circuit portion 22 can be reduced, enabling to improving the radiation efficiency and the radiation pattern. Thus, it can be prevented to make the frequency bandwidth narrower.

Next, an embodiment of the present invention will be described with reference to the accompanying drawings in detail.

Referring to FIG. 2, in a first embodiment of the present invention, the antenna 11 is connected to the lower circuit portion 22, and the resistor is arranged in the middle of each connection line for connecting the upper and lower circuit portions 21 and 22.

Subsequently, an operation of the embodiment of the present invention will be described with reference to FIG. 3 in detail.

A high frequency current induced by the antenna 11 distributes in the lower circuit portion 22 as well as on the antenna 11. Here, if the upper and lower circuit portions 21 and 22 are simply connected with electrical wires, the foregoing high frequency current also distributes in the upper circuit portion 21.

The high frequency current distributing in the upper circuit portion 21 generates electric field and disturbs electric field inherently generated by the high frequency current distributing on the antenna 11. That is, since the upper circuit portion 21 is connected to the lower circuit portion 22, the characteristics of the antenna 11, i.e., the radiation efficiency, the radiation pattern and the like, are deteriorated. Here, if the upper and lower circuit portions 21 and 22 are, in the high frequency manner, insulated, the high frequency current distribution in the upper circuit portion 21 reduces, so that the radiation efficiency and radiation pattern of the antenna 11 become approximately equal to that in the case where the upper circuit portion 21 does not exist. For this reason, FIG. 3 shows the case wherein the resistor is inserted into the connection line 24 for connecting the upper and lower circuit portions 21 and 22 to set the connection line 24 to high impedance, thereby producing an insulating state.

Figure 4:
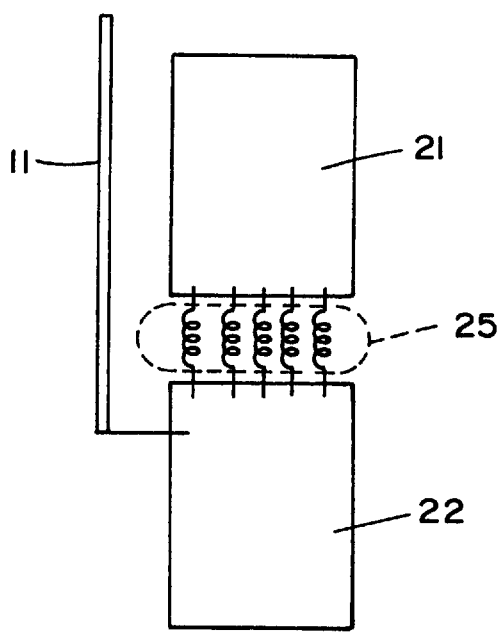
FIG. 4 is a conception drawing of a second embodiment of the present invention, wherein an inductor is connected to the connection line.

Next, a second embodiment of the present invention will be described with reference to FIG. 4. In the first embodiment, the resistor is actually inserted into the connection line 24. However, an inductor 25 may be inserted into the connection line 24 as shown in FIG. 4.

Figure 5:
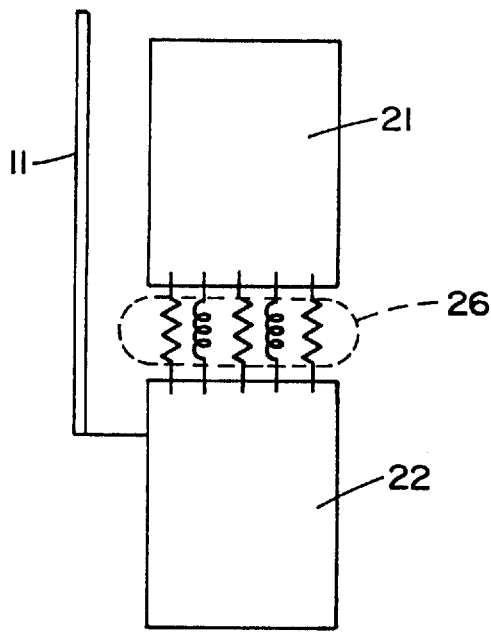
FIG. 5 is a conception drawing of a modification of the second embodiment of the present invention, wherein the resistor and the inductor are selectively connected to the connection line.
Figure 6:
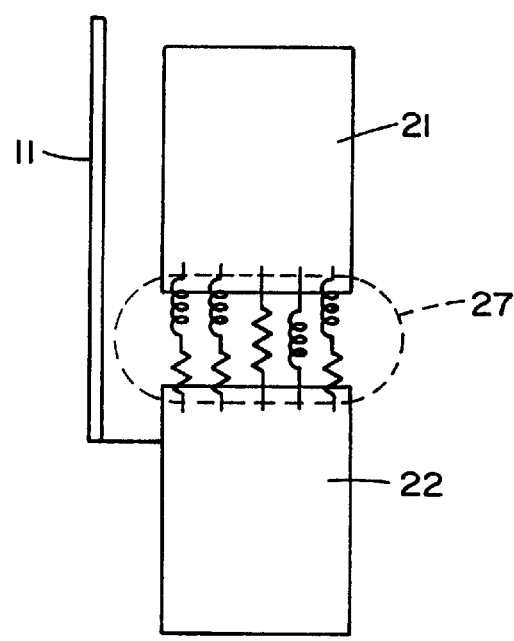
FIG. 6 is a conception drawing of a modification of the second embodiment of the present invention, wherein a set of the resistor and the inductor connected to in series is selectively connected the connection line.

Furthermore, for the modification of the second embodiment, as shown with a reference numeral 26 in FIG. 5, a method wherein the actual resistor and the inductor are alternatively used every connection line may also be adopted. In addition, as another modification of the second embodiment, a set of the actual resistor and the inductor in series connected may be selectively used, whereby the same effects can be obtained (see reference numeral 27 in FIG. 6).

Figure 7:
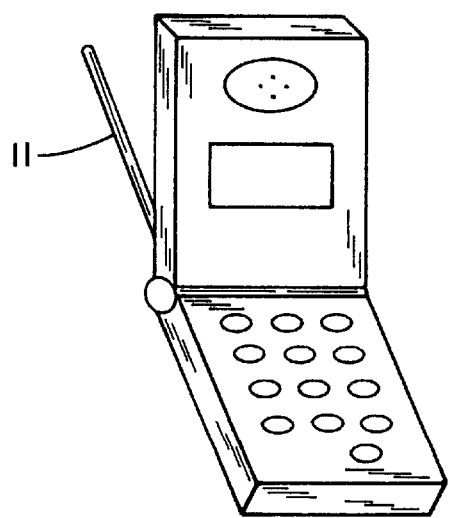
FIG. 7 is a perspective view of a folding unit of the present invention when it is unfolded.

It is a natural that for the flexion unit, the present invention is effective on a folding unit as shown in FIG. 7.

The effect of the present invention is that the distribution of the high frequency current which is induced in the upper circuit portion from the antenna is reduced. Thus, the deterioration in the radiation efficiency and the radiation pattern of the antenna will be reduced. Therefore, this enables to fit the antenna to the flexion portion of the radio unit without the deterioration of the antenna. Thus, it is possible to achieve the portable radio such as the portable telephone having the structure that it can be used in a state where it is apart from the human body.

Although the preferred embodiment of the present invention has been described in detail, it should be understood that various changes, substitutions and alternations can be made therein without departing from spirit and scope of the inventions as defined by the appended claims.

What is claimed is:

1. A portable radio in which an antenna is fitted to a flexion portion of a flexed unit, the portable radio comprising:

upper and lower circuit portions arranged in each of upper and lower unit sections of said flexed unit, said upper and lower circuit portions being divided interposing a fitting portion of said antenna to said flexion portion, said antenna being electrically connected to said lower circuit portion and having an upper portion proximate to the upper circuit portion;

an external conduction body outside said unit;

a plurality of connection lines which connect said upper and lower circuit portions and said conduction body; and a plurality of elements, each being arranged in a middle of corresponding one of said connection lines, said elements serving to cut a conduction of a high frequency current between said upper and lower circuit portions thereby reducing the effect of a generated electric field from the upper circuit portion on the upper portion of the antenna.

2. The portable radio according to claim 1, wherein each element which cuts the conduction of said high frequency current between said upper and lower circuit portions is a resistor.

3. The portable radio according to claim 2, wherein at least one of said resistors which cut the conduction of said high frequency current between said upper and lower circuit portions in said connection lines includes an inductor.

4. The portable radio according to claim 3, wherein said flexed unit is a folding unit, and said antenna is placed at a hinge portion of the folding unit.

5. The portable radio according to claim 2, wherein said flexed unit is a folding unit, and said antenna is placed at a hinge portion of the folding unit.

6. The portable radio according to claim 1, wherein each element which cuts the conduction of said high frequency current between said upper and lower circuit portions is an inductor.

7. The portable radio according to claim 6, wherein said flexed unit is a folding unit, and said antenna is placed at a hinge portion of the folding unit.

8. The portable radio according to claim 1, wherein some of said elements which cut the conduction of said high frequency current between said upper and lower circuit portions are resistors, and the other of said elements are inductors.

9. The portable radio according to claim 8, wherein said flexed unit is a folding unit, and said antenna is placed at a hinge portion of the folding unit.

10. The portable radio according to claim 1, wherein said flexed unit is a folding unit, and said antenna is placed at a hinge portion of the folding unit.

* * * * *